3,437,430
PURIFICATION OF COLUMBIUM AND
TANTALUM PENTOXIDES
Edwin J. Bielecki, Boyertown, and Robert A. Albright, Quakertown, Pa., assignors to Kawecki Chemical Company, New York, N.Y., a corporation of Pennsylvania
No Drawing. Filed Jan. 17, 1966, Ser. No. 520,889
Int. Cl. C01g 33/00, 35/00
U.S. Cl. 23—21                                    2 Claims

ABSTRACT OF THE DISCLOSURE

Small residual amounts of iron are removed from columbium and tantalum oxides by adding ammonium chloride to the oxide, heating it at the sublimation temperature (about 315° C.) of the ammonium chloride to volatilize and carry off the iron, and finally subjecting the oxide to conventional calcination at a temperature above about 900° C.

---

This invention relates to the purification of columbium and tantalum pentoxides and, more particularly, to the removal of small residual amounts of iron present as an impurity in these refractory metal oxides.

Although there are several uses for columbium and tantalum pentoxide that require a high degree of purity, the specifications for optical grade columbium and tantalum oxides are particularly stringent with respect to impurities which impair the color or other optical quality of glass. Of these impurities, iron has been a particularly difficult element to eliminate sufficiently to meet a representative optical grade oxide specification calling for a maximum of about ten parts per million of iron.

We have now discovered that ammonium chloride, known heretofore as an agent for removing iron from other oxides such as alumina and silica, can be used to lower the iron content of otherwise high purity columbium and tantalum pentoxides if certain precautions are taken. Thus, we have found that small residual amounts of iron can be effectively removed from columbium and tantalum oxides by heating the refractory metal oxide in the presence of ammonium chloride at about the sublimation temperature of ammonium chloride for a sufficient period of time to volatilize and remove a significant amount of the iron therefrom before raising the temperature of the refractory metal oxide to its ultimate conventional calcination temperature.

The columbium or tantalum oxide which is treated with ammonium chloride pursuant to the present invention is any such oxide containing more than 10 p.p.m. of iron and can be the oxide per se or the hydrated oxide, to wit, the hydroxide. For example, our method is applicable to the purification of columbium or tantalum hydroxide precipitated from a columbium or tantalum fluoride solution as well as to the purification of columbium or tantalum oxide obtained by oxidation or hydrolysis of columbium or tantalum pentachloride. In the case of the hydroxide, which is thoroughly water-washed to remove the fluoride liquor, the washed product is obtained as a wet filter cake or decant bottom or as an aqueous slurry. In the case of the oxide obtained by combustion of the pentachloride, the oxide is obtained in a dry form.

The ammonium chloride treatment can be effected in either a wet or dry environment. When the columbium or tantalum oxide or hydroxide is obtained in the wet form, it is advantageous to carry out the purification with ammonium chloride in the aqueous medium by adding the ammonium chloride in the form of crystals or solution. When the columbium or tantalum oxide is obtained in the dry state, it is advantageous to maintain this condition by adding the ammonium chloride in the dry form. Although the ammonium chloride can be added as such, it can also be added effectively by adding ammonia gas or ammonium hydroxide to a chloride-containing columbium or tantalum product derived from the corresponding pentachloride. Regardless of whether the admixture is made in the wet or dry state, the components should be thoroughly blended by mechanical mixing, stirring or shaking so as to distribute the ammonium chloride throughout the oxide or hydroxide to be purified.

The amount of ammonium chloride added to the columbium or tantalum oxide is preferably substantially in excess of that stoichiometrically equivalent to the iron content of the columbium or tantalum oxide. The ammonium chloride in excess of the stoichiometric amount serves as a carrier for the iron chloride which is formed and facilitates volatilization and removal of the iron chloride from the columbium or tantalum oxide when the oxide is subsequently heated. Amounts of ammonium chloride less than the stoichiometric requirements are not desirable because they lead to incomplete removal of the iron impurity. Thus, for the purification of columbium or tantalum oxide containing from about 50 to a few hundred parts per million of iron, we have found it desirable to use about 5 to 500% of ammonium chloride by weight of the columbium or tantalum oxide.

The purity of the ammonium chloride is not critical but should be sufficiently high so as not to contaminate the columbium or tantalum oxide with another impurity. Accordingly, a good commercial grade of ammonium chloride can be used satisfactorily, although higher purity grades such as the C.P. grade are presently preferred.

When admixture of the columbium or tantalum oxide with the ammonium chloride takes place in an aqueous environment, the aqueous medium is physically removed by filtration or the like in order to lighten the load on the subsequent heating step. The residual entrained ammonium chloride will be sufficient under these conditions to provide the necessary concentration to convert the iron impurity to iron chloride and to effect its removal by volatilization. Any residual water present in the filter cake is ultimately driven off during the heating operation.

The heating operation, following the water removal step where necessary, should not be carried out as a conventional calcining step. Rather, the heating should be continued only to about the sublimation temperature (about 335° C.) of the residual ammonium chloride present in the treated refractory metal oxide. At such an ultimate temperature, virtually all of the ammonium chloride will eventually be driven off and with it the iron chloride which has a boiling point of about 315° C. Moreover, by heating the oxide only to about 335° C., or slightly higher, the oxide is raised to this temperature more slowly than if it were being heated directly to calcination temperature, and this relatively slow heating is conducive, we have found, to more effective removal of the iron component from the columbium or tantalum oxide. By the time the oxide mass has been raised to a temperature sufficiently high to remove effectively any residual ammonium chloride, the iron chloride will have been also removed and the oxide can then be calcined under the conventional conditions, 900° C. or higher and preferably about 1000° C., required to insure the removal of all water and development of the pure oxide form.

The following specific example is illustrative of the practice of the invention:

A charge of 100 grams of crystalline ammonium chloride was blended with 20 grams of calcined $Cb_2O_5$ containing 50 p.p.m. Fe (metal to metal basis). The mixture was placed in a suitable crucible and was heated in a muffle furnace maintained at 335° C. The mixture was held in the furnace until visible fuming ceased. The furnace temperature was then raised to 1000° C. and the mixture was held in the furnace for an additional one hour to complete calcination of the $Cb_2O_5$. The final product contained 10 p.p.m. Fe (metal to metal basis).

We claim:

1. The method of removing small residual amounts of iron present as an impurity in amounts of at least 10 p.p.m. and up to several hundred p.p.m. in a refractory metal oxide of the group consisting of columbium and tantalum oxides and hydroxides which comprises intimately admixing at ambient temperature ammonium chloride with the refractory metal oxide in amount in excess of that stoichiometrically required to combine with the iron content of the oxide, heating the resulting mixture of the refractory metal oxide and the ammonium chloride up to about the sublimation temperature of ammonium chloride in a furnace maintained at about 335° C. so as to provide heating for a sufficient period of time to volatilize and remove a significant amount of the iron therefrom, and thereafter calcining the resulting refractory metal oxide of significantly lowered iron content at a temperature above about 900° C.

2. The method according to claim 1 in which the amount of ammonium chloride brought into contact with the refractory metal oxide is about 5 to 500% by weight of the refractory metal oxide.

References Cited

UNITED STATES PATENTS

| 2,911,286 | 11/1959 | Potter. | |
|---|---|---|---|
| 2,980,496 | 4/1961 | Mettler | 23—140 X |

FOREIGN PATENTS

| 516,880 | 1/1940 | Great Britain. |
|---|---|---|

OTHER REFERENCES

May et al., "Industrial & Engineering Chemistry," vol. 46, December 1954, pp. 2495–2499.

HERBERT T. CARTER, *Primary Examiner.*

U.S. Cl. X.R.

23—140, 87